United States Patent
Carlson et al.

(10) Patent No.: US 8,204,757 B2
(45) Date of Patent: Jun. 19, 2012

(54) DYNAMIC FOOD ORDERS DURING TRAVEL

(75) Inventors: Michael Pierre Carlson, Austin, TX (US); Linda Arnold Lisle, Cedar Park, TX (US); Newton James Smith, Jr., Austin, TX (US); Clifford Jay Spinac, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1642 days.

(21) Appl. No.: 11/335,453

(22) Filed: Jan. 19, 2006

(65) Prior Publication Data

US 2007/0168205 A1     Jul. 19, 2007

(51) Int. Cl.
*G06Q 10/00* (2012.01)
*G06Q 90/00* (2006.01)

(52) U.S. Cl. .......................... 705/1.1; 705/500
(58) Field of Classification Search ............. 705/1.1, 705/14.1–14.73, 15, 300–348, 901–912
See application file for complete search history.

(56) References Cited

U.S. PATENT DOCUMENTS

| | | | |
|---|---|---|---|
| 4,797,818 A * | 1/1989 | Cotter | 705/15 |
| 5,235,509 A * | 8/1993 | Mueller et al. | 705/15 |
| 5,504,589 A * | 4/1996 | Montague et al. | 358/403 |
| 5,845,263 A * | 12/1998 | Camaisa et al. | 705/15 |
| 5,912,743 A * | 6/1999 | Kinebuchi et al. | 358/442 |
| 5,969,968 A * | 10/1999 | Pentel | 705/26 |
| 6,026,375 A * | 2/2000 | Hall et al. | 705/26.43 |
| 6,473,739 B1 | 10/2002 | Showghi et al. | |
| 6,920,431 B2 | 7/2005 | Showghi et al. | |
| 7,174,308 B2 * | 2/2007 | Bergman et al. | 705/27.1 |
| 2001/0051877 A1 * | 12/2001 | Steval | 705/1 |
| 2003/0050854 A1 * | 3/2003 | Showghi et al. | 705/26 |
| 2003/0236706 A1 * | 12/2003 | Weiss | 705/15 |
| 2005/0114149 A1 * | 5/2005 | Rodriguez et al. | 705/1 |

OTHER PUBLICATIONS

Kate Murphy, "Grocery Shopping in Cyberspace Means No Squeezing the Produce", New York Times (Late Edition (East Cost)), New York, N.Y. May 12, 1997, p. D4.*
Susanna Voyle, "Online Ordering Forecast to Rise to L42bn Within Next Five Years; [London Edition]", Financial Times, London (UK), Dec. 17, 2001, p. 24.*

* cited by examiner

*Primary Examiner* — Gerardo Araque, Jr.
(74) *Attorney, Agent, or Firm* — Yee & Associates, P.C.; David A. Mims, Jr.

(57) ABSTRACT

Creating a dynamic food order for a traveler is provided. A food order is received from the traveler. A determination is made as to whether a real-time itinerary for the traveler has changed. In response to a change in the real-time itinerary, the food order is adjusted based on the real-time itinerary and preferences stored in the traveler's profile to form an adjusted food order.

20 Claims, 4 Drawing Sheets

DYNAMIC FOOD ORDERS DURING TRAVEL

BACKGROUND OF THE INVENTION

1. Field of the Invention

The present invention is related generally to an improved data processing system, and in particular to a method, computer usable program code, and an apparatus for processing transactions. In particular, the present invention is directed to a method, computer usable program code, and an apparatus for dynamically ordering food during travel.

2. Description of the Related Art

Travelers are presented with limited meal options when traveling. Carriers that provide meals to travelers frequently offer only a limited selection of simple food items. In the case of the airlines, many of these types of carriers have discontinued in-flight meal service of any kind in order to reduce costs. In addition, some carriers merely offer a traveler a small snack or drink option during travel, in which case, a traveler may need to purchase additional food from another source.

Travelers are typically permitted to bring food items with them during travel. However, purchasing food items can be a time-intensive task that requires waiting in lines at a food vendor or picking items up from a stand. If a passenger has insufficient time available prior to departure, the traveler may have to go the entire day without eating.

SUMMARY OF THE INVENTION

The aspects of the present invention provide a computer implemented method, apparatus, and computer usable program code to create a dynamic food order for a traveler. A food order is received from the traveler. A determination is made as to whether a real-time itinerary for the traveler has changed. In response to a change in the real-time itinerary, the food order is adjusted based on the real-time itinerary to form an adjusted food order.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
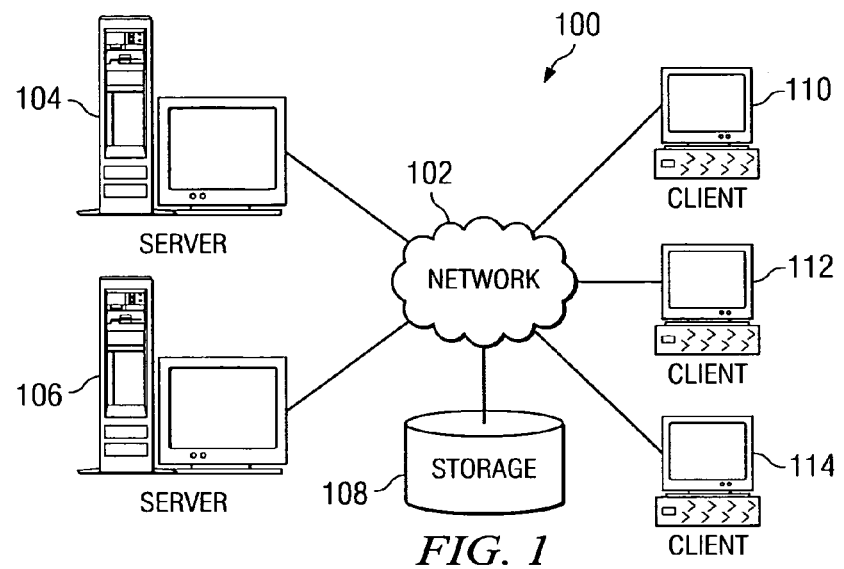
FIG. 1 is a pictorial representation of a network of data processing systems in which aspects of the present invention may be implemented.
Figure 2:
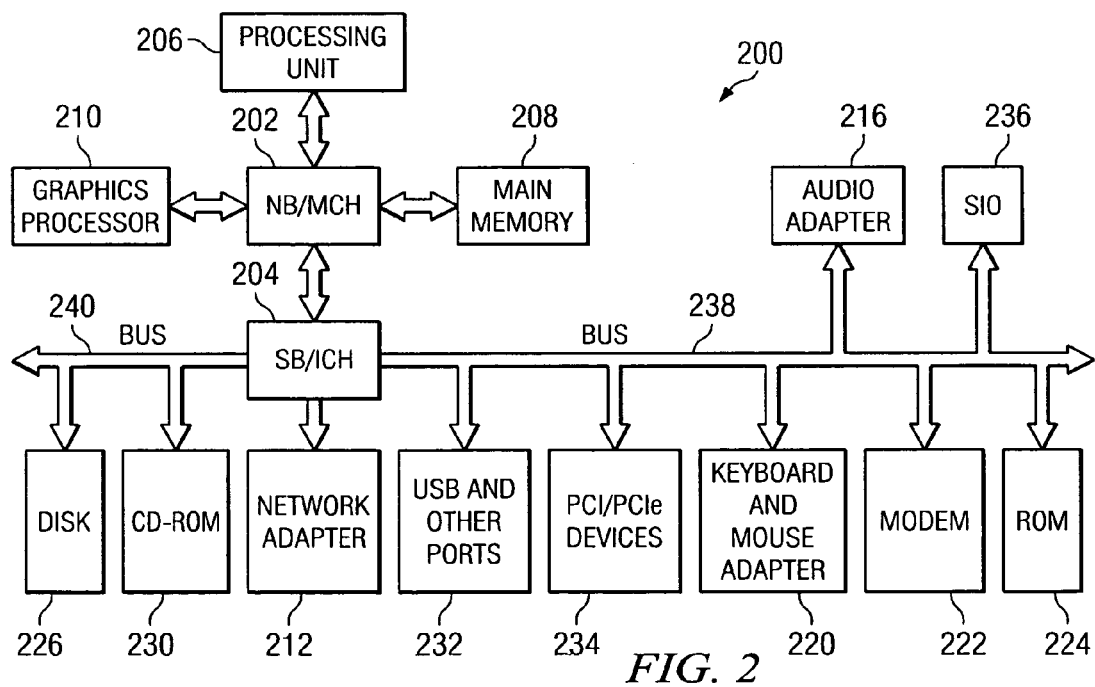
FIG. 2 is a block diagram of a data processing system in which aspects of the present invention may be implemented.

With reference now to the figures and in particular with reference to FIGS. 1-2, exemplary diagrams of data processing environments are provided in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. The aspects of the present invention can be implemented in network data processing system 100 to provide dynamic food orders for uses during travel. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers.

In accordance with one embodiment of the present invention, a carrier provides a server that is accessible by a user at a client. For example, a server for an airline is accessible to a user at a client to access the airline's website. In accordance with the embodiments of the present invention, a client can be a computer at a user's home, a PDA, a phone carried by the user, or a kiosk at the airport.

In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries™ computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for embodiments of the present invention are performed by processing unit 206 using computer usable program code, which may be located in a memory such as, for example, main memory 208, ROM 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course, the bus system may be implemented using any type of communication fabric or architecture that provides for a transfer of data between different components or devices attached to the fabric or architecture. A communication unit may include one or more devices used to transmit and receive data, such as modem 222 or network adapter 212 of FIG. 2. A memory may be, for example, main memory 208, ROM 224, or a cache such as may be found in NB/MCH 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The aspects of the present invention provide an improved method, apparatus, and computer usable program code for creating a dynamic food order for a traveler. A carrier typically permits a traveler to bring food items with them as they travel on a carrier conveyance. A carrier is defined as a person, business, or organization that operates in the transportation of travelers by means of a carrier conveyance. A carrier conveyance is defined as a means to transport passengers. Examples of a carrier conveyance include a plane, train, helicopter, bus, ship, boat, or any other means of passenger transport.

A user can access a carrier's website to make travel plans and request information regarding the traveler's itinerary. For example, many carrier websites permit users to make travel reservations, print electronic tickets, check the traveler's itinerary, rent a car, or check for updated departure and arrival times.

Figure 3:
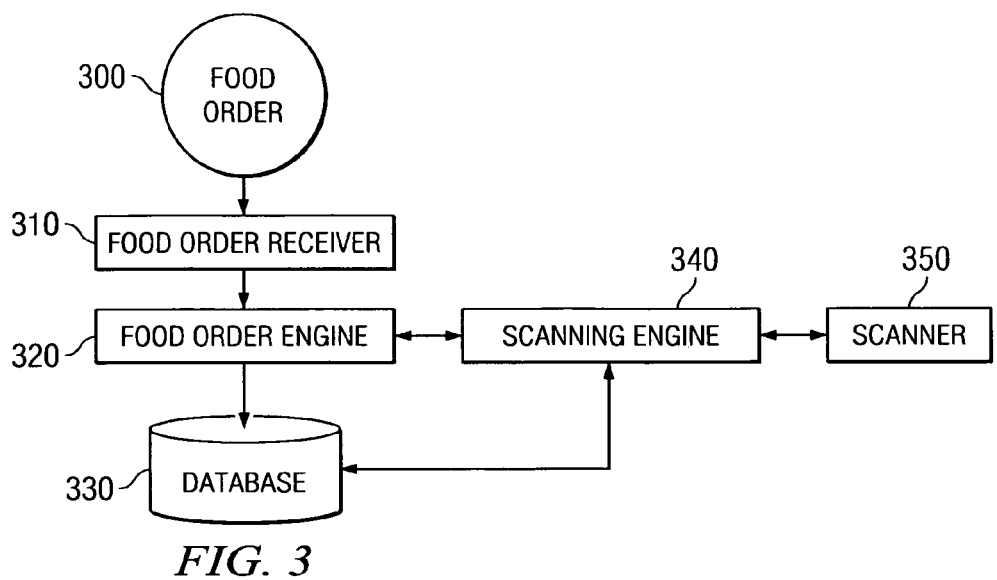
FIG. 3 is an exemplary block diagram illustrating the process of making a food order in accordance with an illustrative embodiment of the present invention.

FIG. 3 depicts an exemplary block diagram illustrating the process of making a food order in accordance with an embodiment of the present invention. A traveler can make a food order 300 utilizing a food order receiver 310. Food order receiver 310 queries the traveler regarding the traveler's preferences. A food order receiver includes a web application, a web service that receives the food order, a client such as a personal computer, a laptop, a PDA, a cellular phone, a kiosk at the airport, an email server, or any other device depicted in FIG. 1. An example of a food order receiver includes a carrier's website or a food provider's website. A website in accordance with the aspects of the present invention may be a static web page, a dynamic web page, a portal page, or any other type of web page provided by a web server.

A food order receiver receives a food order from a traveler. A user enters a food order, such as food order 300, and food order preferences on a food order receiver, such as food order receiver 310. Food order receiver 310 sends food order 300 to food order engine 320. In accordance with an embodiment of the present invention, food order receiver 310 and food order engine 320 can be embodied in a single component. In another embodiment of the present invention, food order engine is located on a carrier's website or a food provider's website. When the user logs into the website, the food order engine retrieves a history of the traveler's past food orders from the traveler's profile. The system can propose a meal order based on the traveler's past food orders. In another embodiment of the present invention, the food order engine is a single server or a collection of back end servers. A food order can be dispatched from food order engine to various nodes in the data processing system for fulfillment by providers. A node in a data processing system includes a server, a client, or any other device depicted in FIG. 1.

Food order engine 320 receives the food order from a food order receiver 310. A user can indicate food order preferences, such as food order content, time of delivery, and location of delivery at the time that the user makes the food order. Food order engine 320 retrieves the traveler's real-time itinerary from database 330. Food order engine 320 determines whether the real-time itinerary for the traveler has changed. In response to a change in the real-time itinerary, food order engine 320 adjusts food order 300 based on the real-time itinerary to form an adjusted food order.

Food order engine 320 stores information regarding the traveler's dynamic food order in database 330. Food order engine 320 adjusts food order 300 based on traveler's preferences stored in database 330. If a traveler's preferences are not available, the food order engine can adjust the food order based on a default set of rules for adjusting a food order.

In accordance with an embodiment of the present invention, traveler may choose to have a food order delivered to the traveler when the traveler's ticket is scanned at the point of departure. When a traveler's ticket is scanned, a scanner can provide an indication that the traveler's food order is ready for delivery. When the traveler's ticket is scanned, the scanner transmits the traveler's information to a scanning engine, such as scanning engine 340. Scanning engine 340 receives the traveler's information when the traveler's ticket is scanned by scanner 350. Scanning engine 340 check's database 330 to determine if the traveler made a food order. If a determination is made that the traveler made a food order, scanning engine 340 consults with food order engine 320 regarding the traveler's food order. The traveler's food order is delivered in accordance with the traveler's indicated preferences when the ticket is scanned.

In an embodiment of the present invention, if the traveler's food order is ready for delivery, that information is transmitted to the scanner by the scanning engine. In another embodiment, the scanning engine and the scanner can be the same device.

Figure 4:
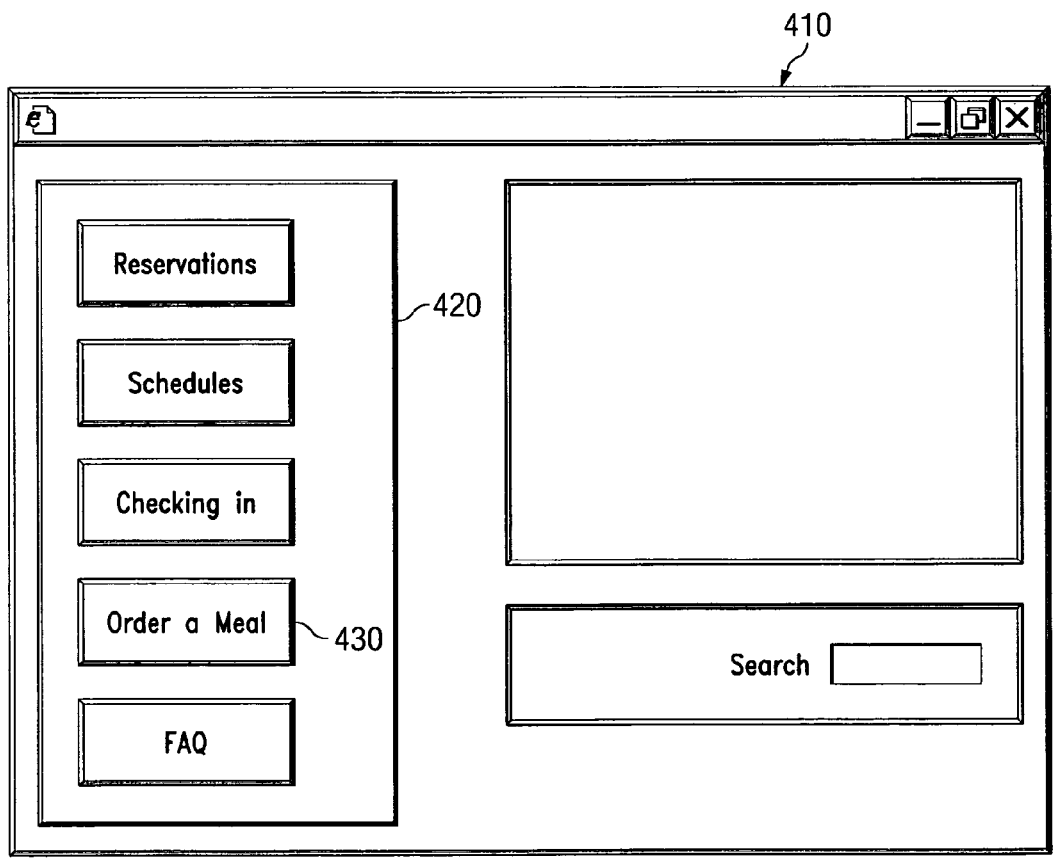
FIG. 4 is an exemplary block diagram illustrating a website for making a dynamic food order in accordance with an illustrative embodiment of the present invention.

FIG. 4 depicts a web page for making a dynamic food order in accordance with an illustrative embodiment of the present invention. A user logs into a carrier's website using web page 410 to access the traveler's profile. For example, a traveler flying with an airline would log onto the airline carrier's web page. If the traveler were flying on American Airlines®, the user would log onto the web page for American Airlines®.

After logging in to the website, the carrier's system displays the traveler's itinerary, payment information, and traveler's previous preferences. In this example, web page 410 provides the user with menu 420 of options. The user can click on a graphical control, such as control 430 on menu 420 to order a meal.

The process of the present invention displays a selection of food providers and food item options to the user for use in ordering food, in response to choosing to order a meal. A food provider is defined to mean any person, organization, or business operating to provide food to consumers, such as a restaurant, retail store, fast food chain, or other food vendor. A food item is defined to include any solid or liquid food item. For example, food items include desserts, snacks, sandwiches, soups, salads, sodas, water, ice, coffee, juice, and/or any other comestibles.

After making a food order, the user will be provided with delivery options. A user may select to have a food order delivered to a point of departure. A point of departure is defined as a location at which a traveler boards a carrier conveyance. Examples of a point of departure include, for example, a departure gate at an airport, a boarding ramp at a dock for boarding a ship or boat, a boarding area in a train terminal, or a boarding area in a bus depot for boarding a bus.

A user may also elect to have a food order delivered at a point of arrival. A point of arrival is defined as a location at which a traveler exits or disembarks from a carrier conveyance. An example of a point of arrival is an arrival gate at an airport, baggage claim area, or other location in a facility at which the traveler is arriving or disembarking.

The embodiments of the present invention may be implemented on a graphical user interface (GUI), a command-line interface, a menu-driven interface, or any combination of these interfaces. The illustrative examples in the figures are implemented using a graphical user interface in the form of web pages, but may be implemented using other types of graphical user interfaces. These graphical user interfaces include, for example, a client application, an applet, a text message, an email, a web based application, such as a browser, or a local graphical user interface constructed from a native application, such as a Java 2 platform Micro Edition (J2ME) MIDlet, or an embedded Rich Client Platform (eRCP).

Figure 5:
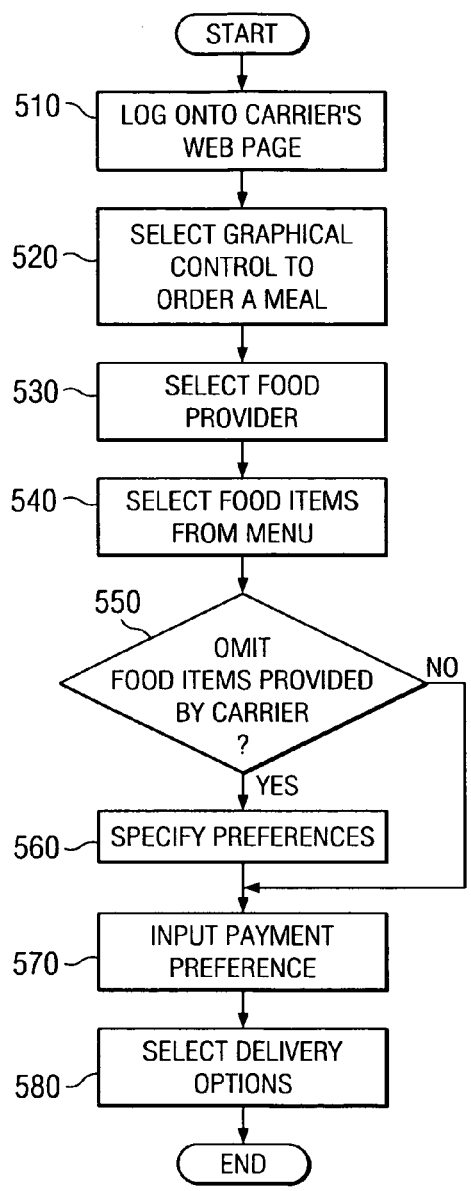
FIG. 5 is a flowchart outlining an exemplary operation of the present invention when a user makes a food order on a website in accordance with an illustrative embodiment of the present invention.

FIG. 5 depicts a flowchart outlining an exemplary operation of the present invention when a user makes a food order on a portal web page in accordance with an illustrative embodiment of the present invention. This flow shows the steps performed by a user. A user logs on to a carrier's web page (step 510). The traveler's profile is accessed so that the system has the traveler's itinerary and payment information. For example, if a traveler is flying, the system has the traveler's flight and gate information, departure and arrival times, and connecting flights.

The user selects a graphical control to order a meal (step 520). In step 520 this graphical control may be for example, control 430 in FIG. 4. In accordance with the aspects of the present invention, a user can select to order a meal by clicking on a graphical control, a link, a menu, an icon, or any other part of a graphical user interface (GUI) or by selection of a menu item on a menu driven interface provided on the carrier's website. Implementation of graphical user interfaces and menu-driven interfaces are known in the prior art.

A user chooses a food provider from a selection of food providers to deliver at either the point of departure or the point of arrival (step 530). The user selects food items for the food order from a menu of available food items for the selected vendor (step 540). The user may select a preference to omit a food item that is provided by a carrier (step 550). For example, if a user selects a soft drink that is provided by the carrier, the user may wish to omit that soft drink food item from the traveler's food order. However, if the carrier provides soft drinks, but does not provide the brand of soft drink desired by the traveler, the user may prefer to include the soft drink in the food order. The user can specify preferences as to omitting food items provided by a carrier (step 560) or to complement the food items provided by the carrier. In other embodiments, the user can specify preferences regarding adjusting the food order, such as adjusting food order content and adjusting the food order delivery time and delivery location based on a real-time itinerary for the traveler. The user also inputs a payment preference (step 570) and selects delivery options (step 580) for the meal order.

A traveler is the person traveling or planning to travel from a point of departure to a point of arrival by a carrier conveyance. A user and a traveler can be the same person. However, a user could also be someone other than the traveler. For example, a user could be a travel agent, the traveler's assistant, the traveler's agent, a parent, or any other person or organization acting on behalf of the traveler.

In accordance with an illustrative embodiment of the present invention, a user may select to have a food order delivered to the traveler at a point of departure or at a point of arrival. For example, if the traveler is flying, the user may elect to have a food order delivered to the traveler at the departure gate, the arrival gate, the boarding area, the baggage claim area, the baggage check area, at a rented car, or at any other specified location at or near the airport.

A food order can also be delivered to a point of departure or a point of arrival for a connecting flight. If a traveler has a connecting flight, the user may select a food order to be delivered at a point of arrival or at a point of departure for the connecting flight. For example, a traveler flying from Los Angeles to Miami could have a connecting flight in Chicago with insufficient layover time to purchase a meal prior to boarding the connecting flight to Miami. The user can select to have a food order delivered at the arriving gate in Chicago when the traveler arrives in Chicago from Los Angeles. In the alternative, the user could select to have a food order delivered to the departing gate in Chicago when the traveler boards the connecting flight from Chicago to Miami. In this manner, the traveler can avoid purchasing a food order in Los Angeles that the traveler will have to carry during the flight from Los Angeles to Chicago until the traveler is ready to eat the meal. The traveler can also avoid the inconvenience of going without a meal until arrival in Miami.

Further, a traveler may request delivery of a food order at any location within an airport, train depot, bus depot, dock, or other boarding area or embarkation area for a particular carrier conveyance. In addition, carriers can charge a surcharge for food orders for the convenience to travelers in order to generate additional revenue.

Although the present invention has been described primarily with reference to making a food order utilizing a food order receiver such as a carrier's website or a food provider's website, the aspects of the present invention are not limited to making a food order via a website. In other embodiments of the present invention, the food order could also be placed using a telephone voice connection or Short Message Service (SMS), Instant Messaging (IM), or e-mail. A telephone Voice Response System (VRS) can present the user with available food order options for selection by using the telephone keypad or word recognition.

Short Message Service (SMS) or Instant Messaging (IM) can be used for pre-selected food orders in accordance with the aspects of the present invention. A user can specify a number identifying a food order via the Short Message Service or Instant Messaging to make a food order, to check the status of a food order, and/or to make changes to the food order. For example, a menu can be provided to a user with the following pre-selected options: (1) check a food order status; (2) change food order; and (3) cancel food order. A user can enter a number on a numeric keypad which corresponds to a pre-selected option.

In another embodiment, a dynamic food order may be entered by email. A user emails a custom order which would be processed manually by a person. In another embodiment of the present invention, an email template can be provided for a user to enter meal selections. The emailed food order entered using the template would be processed automatically according to the aspects of the present invention.

Figure 6:
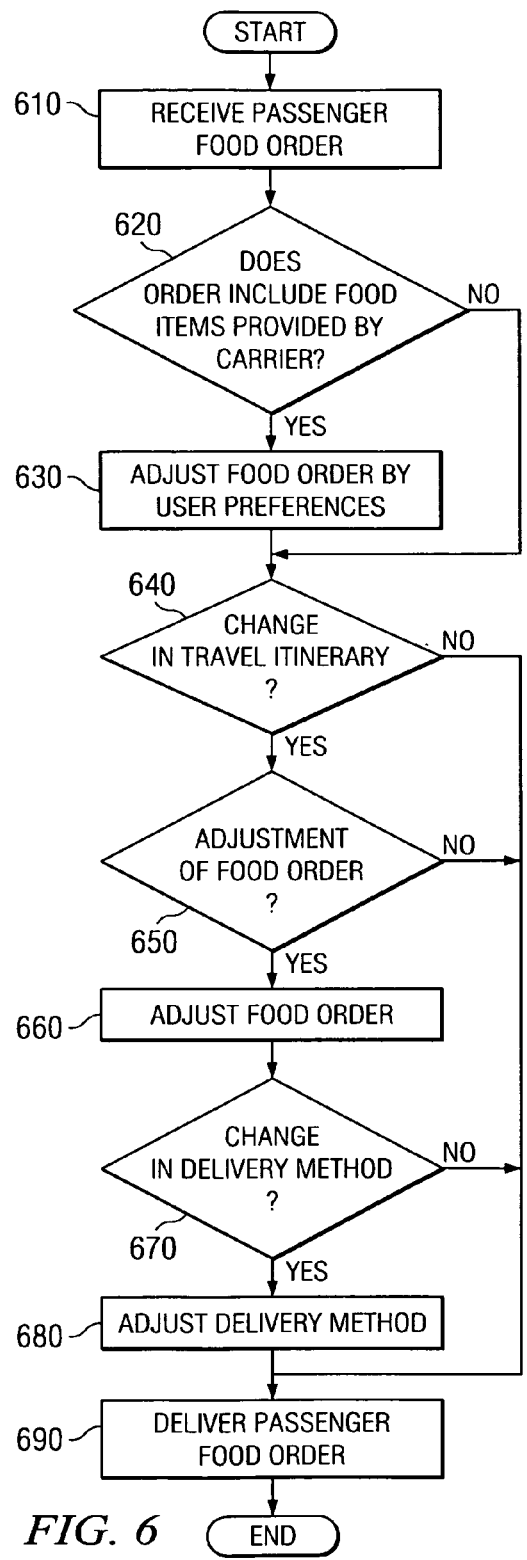
FIG. 6 is a flowchart outlining an exemplary operation of the present invention when a food provider receives a food order from a user in accordance with an illustrative embodiment of the present invention.

FIG. 6 is a flowchart outlining an exemplary operation of the present invention when a food provider receives a food order from a user in accordance with one embodiment of the present invention. The process is implemented by food order engine 320 in FIG. 3.

A food order engine receives the food order entered by the user (step 610) from a food order receiver. The food order engine determines if the food order includes food items that are provided by the carrier during travel (step 620). If the food order includes food items provided by the carrier during travel, the food order is modified to remove the food item provided by the carrier during travel, in accordance with the traveler's preferences (step 630). For example, if the user orders a hamburger, fries, and a soft drink and the carrier provides complementary soft drinks during the flight, food order engine may modify the food order to exclude the soft drink from the food order.

However, if the user orders a soft drink brand that is not provided by the carrier, the traveler may prefer that the food order engine not modify the food order to exclude the soft drink. For example, if the user orders a Pepsi® and the carrier does not provide Pepsi® brand soft drinks, the food order engine will not modify the food order to exclude the Pepsi® from the traveler's food order.

In another embodiment, the user may select a balanced meal, and the contents of the food order are adjusted to complement what the carrier provides. In one embodiment of the present invention, the food order engine will not modify the food order if the user selects the food order not to be modified. For example, although the carrier provides soft drinks to travelers during travel, if the user selects the food order not to be modified, the food order engine will not modify the traveler's food order to exclude the soft drink.

The food order engine maintains a real-time itinerary for the traveler. The traveler's food order can be adjusted based on the traveler's real-time itinerary. For example, if the traveler's itinerary changes, the food order can be adjusted in accordance with the traveler's preferences.

The food order engine determines if there is a change in the traveler's itinerary (step 640). For example, a traveler's point of arrival and point of departure can change. A traveler scheduled to land in Dallas for a layover may land in Houston instead. The food order engine maintains a real-time itinerary regarding the traveler's point(s) of departure and point(s) of arrival and adjusts the food order according to the point(s) of departure and point(s) of arrival.

A traveler's arrival time(s) and/or departure time(s) may also change. For example, a plane scheduled to take off at 10:00 am may be delayed for departure until noon. The food order engine maintains a real-time itinerary for the traveler's arrival and departure times and can adjust a food order in accordance with a change in the traveler's itinerary. If the food order engine determines that there is a change in the traveler's itinerary, the food order engine determines if the food order should be changed (step 650). For example, if a flight is delayed wherein the food order would be delivered at midnight, the food order may be adjusted to include only a light snack instead or the food order could be canceled, as specified by the user.

The determination as to whether the food order will be changed is made based on traveler preferences selected by the user. A user can enter traveler preferences at the time the food order is made or by entering preferences into a user profile in a traveler's account. A traveler's account can be an account with the carrier or an account with a food provider. If traveler preferences are not available, a food order can be adjusted based on a default set of rules for adjusting a food order.

If a determination is made that a food order should be changed, the food order is adjusted by the food order engine and an adjusted food order is delivered to the traveler. An adjusted food order includes adjusted food order content, an adjusted time of delivery for the food order, and/or an adjusted delivery location for the food order.

The content of a food order is adjusted based on the traveler's itinerary and the traveler's preferences. If a traveler's arrival and/or departure time has been changed, the traveler may desire a different food item to be delivered. For example, if the user selects a breakfast-type food item, such as orange juice and/or a breakfast muffin, for delivery at the departure gate at 9:00 am and the food order engine determines that the traveler's flight departure has been delayed until 11:30 am, the traveler may desire to substitute lunch-type food items instead of the breakfast meal. Moreover, if the point of departure or the point of arrival has changed, a food item ordered by traveler may not be available in the different location. For example, if the traveler has a layover in Chicago, the traveler may have ordered a Chicago style pizza, which may not be available at another location. In this case, the traveler's food order content can be adjusted to substitute a different food item, as indicated by the traveler's preferences. If the food order engine determines that a food order modification based on a traveler's itinerary is desired by the traveler, the food order engine adjusts the food order (step 660).

In accordance with one embodiment of the present invention, a determination as to whether a traveler would desire a food order modification may be made based on the traveler's preferences entered at the time the user made the food order.

The food order engine also may determine if a food order delivery time should be altered based on the traveler's itinerary. For example, a traveler flying on a plane scheduled to arrive at noon may choose a food order to be delivered at the arriving gate at noon. If the food order engine determines that the traveler's plane will be delayed in arriving until 12:30 pm, the food order engine will modify the food order delivery time to coincide with the traveler's delayed arrival time. In accordance with one embodiment of the present invention, a determination of whether a traveler would desire modification of the food order delivery time may be made based on the traveler's preferences entered at the time the user made the food order.

The food order engine also determines if a change in the delivery method should be made based on the traveler's real-time itinerary (step 670). A determination as to whether a change in the delivery method should be made is based on the traveler's preferences. If the traveler's preferences are not available, a determination as to whether the delivery method should be changed can be made based on a default set of rules.

A change in a delivery method includes a change in delivery location and/or a change in delivery time. For example, if a traveler traveling by plane has ordered a meal to be delivered at the departure gate at the scheduled departure time at noon and the traveler's flight is delayed for an hour, the traveler may wish for the meal to be delivered at noon at the pre-boarding area, the baggage check-in area, another location in the airport, or at a location in the traveler's route rather than at the departure gate.

If the food order engine determines that a change in the delivery method should be made, the food order engine modifies the delivery method (step 680). If the delivery location and/or delivery time is modified, the content of the food order is delivered to the traveler at the modified delivery location and/or delivery time (step 690). If the content of the food order was modified based on the traveler's itinerary, the adjusted content of the food order is provided to the traveler at the determined delivery time and delivery location. The adjusted food order is provided to the traveler. The process terminates upon delivery of the food order.

In accordance with an embodiment of the present invention, a determination of whether a traveler would desire modification of the food order delivery location may be made based on the traveler's preferences entered at the time the user placed the food order. In accordance with another embodiment of the present invention, the traveler may select to pick up the food order at the food provider's location. A notification to the user may be made to inform the traveler about the adjusted delivery location.

Figure 7:
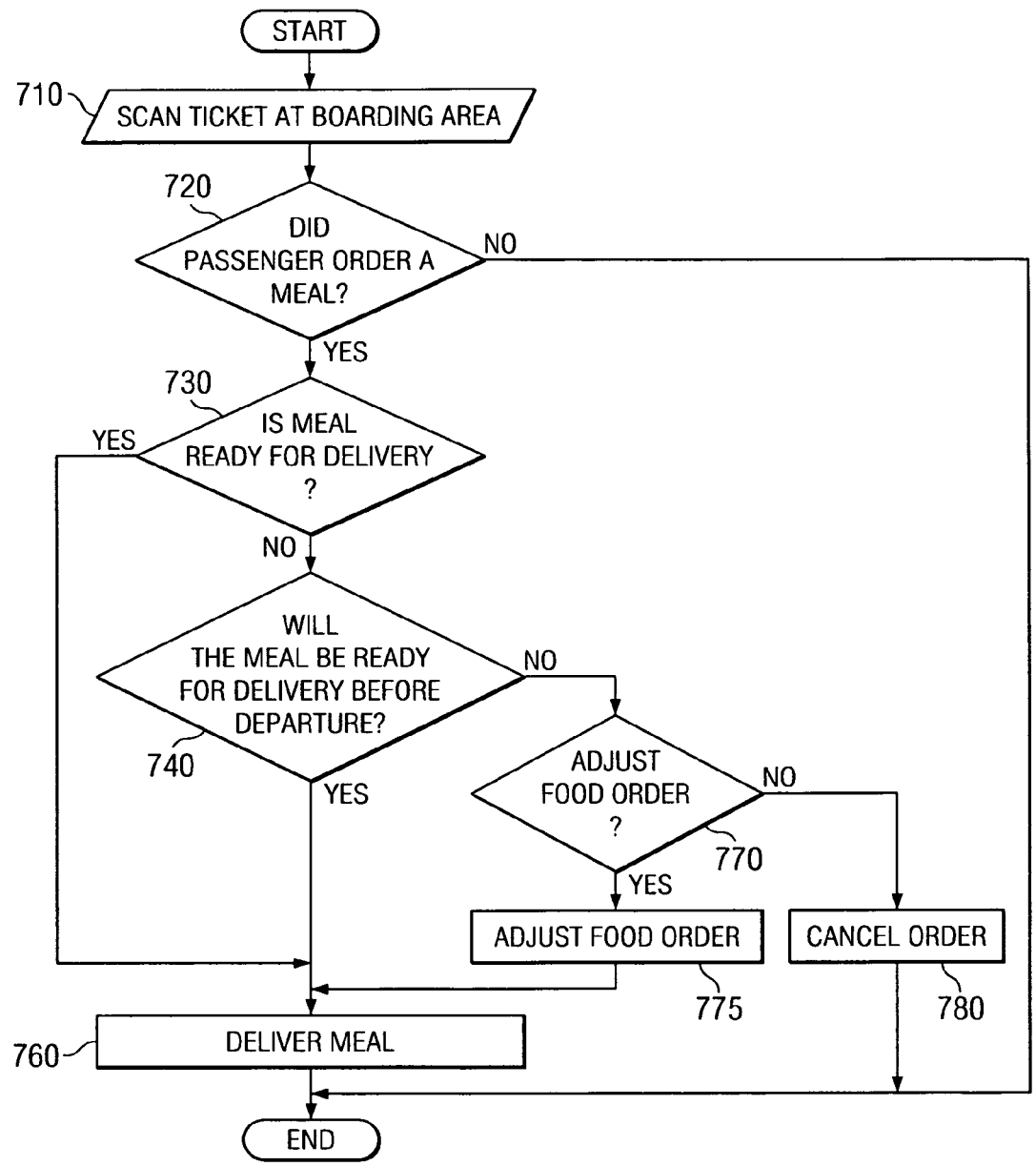
FIG. 7 is a flowchart outlining an exemplary operation of the present invention when a traveler's ticket is scanned in accordance with an illustrative embodiment of the present invention.

FIG. 7 is a flowchart outlining an exemplary operation of the present invention when a traveler's ticket is scanned in accordance with an illustrative embodiment of the present invention. The fist step in the process is implemented by scanner 350 in FIG. 3. The remainder of the process is implemented by scanning engine 340 in FIG. 3.

Scanner 350 scans a traveler's ticket (step 710) and provides information regarding a traveler's ticket to scanning engine. The scanning occurs in these examples when an employee passes the traveler's ticket through a scanning device at a boarding area prior to boarding a carrier conveyance. This scanning device may be a magnetic or optical scanner depending on the implementation. For example, if a traveler is flying, the traveler's ticket is scanned as the traveler approaches the gate to board the plane. The scanning engine checks the food order information stored in database 380 to determine if the traveler ordered a meal (step 720). In accordance with one embodiment of the present invention, if the passenger did order a meal, the scanning engine determines if the meal is ready for delivery (step 730). If the meal is ready for delivery, identification of the meal is provided to personnel who deliver the meal to the traveler as the traveler boards the carrier conveyance (step 760). Personnel include, but are not limited to, employees of the carrier, employees of the facility in which the carrier operates, employees of the food provider, or any other authorized delivery person. In other embodiments of the present invention, a food order can be provided to the traveler at the time the traveler's ticket is scanned by means of self-service rather than delivery by personnel.

If the meal is not yet ready for delivery, the scanning engine determines if the meal will be ready for delivery prior to departure (step 740). If the meal will be ready prior to departure, the meal can be delivered to the traveler at the point of departure. For example, if the traveler is flying and the food order is not ready when the traveler boards the plane but will be ready prior to departure, the food order can be delivered to the traveler on board the plane.

If the meal will not be ready prior to departure, the scanning engine makes a determination as to whether to adjust the food order to form an adjusted food order (step 770). A determination as to whether to adjust the food order can be made based on the traveler's preferences. If a traveler's preferences are not available, a determination as to whether to adjust the food order can be made based on a default set of rules.

An adjusted food order can include an adjusted time of delivery for the food order, adjusted food order content, and/or an adjusted delivery location for the food order. For example, if the food order is not ready for delivery at the time the traveler is departing from a point of departure, the traveler may wish for an adjusted food order to be delivered to the traveler at the arrival gate at the traveler's point of arrival. If an adjusted food order is desired by the traveler, the food order is adjusted (step 775) and the adjusted food order is delivered (step 760). In response to adjusting the food order, a notification of an adjustment to the food order may be sent to the traveler. However, if an adjusted food order is not desired, the food order can be canceled (step 780). The process terminates upon delivery or cancellation of the food order.

The aspects of the present invention permit a traveler to pick up food at a food vendor or have the food order waiting for the traveler at a point of departure, a point of arrival, or at a point en route. The embodiments of the present invention may be implemented in accordance with a traveler traveling by airplane, helicopter, train, bus, ship, boat, or any other carrier conveyance.

Because a traveler logs into a carrier's website to make a food order, the food order engine knows the traveler's itinerary and can dynamically deliver food in accordance with a traveler's arrival and/or departure time and arrival and/or departure location, such as a gate or other waiting area. In addition, the food order engine can modify the content of a food order, its delivery time, or its delivery location based on delays or other changes in a traveler's arrival or departure times. Thus, the aspects of the present invention eliminate time spent in lines at the airport, train depot, bus depot, or other point of departure or point of arrival. A traveler is also provided with greater flexibility in food options available while traveling.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any other instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and Digital Video/Versatile Disk (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention and its practical application, and to enable others of ordinary skill in the art to understand the invention for various embodiments with various modifications as are suited to the particular use contemplated.

What is claimed is:

1. A computer implemented method in a data processing system for creating a food order for a traveler, the computer implemented method comprising:

displaying by a data processing system of a carrier a list of non-carrier food providers to the traveler on a website of the carrier for use in ordering food items;

receiving by the data processing system of the carrier a selection of a food provider by the traveler from the displayed list of non-carrier food providers on the website, wherein the traveler selects food items for the food order from available food items of the selected food provider, and wherein the selected food provider provides the food items for the traveler;

receiving by the data processing system of the carrier the food order of the selected food provider from the traveler;

determining by a processor communicatively coupled to the data processing system of the carrier whether the food order of the selected food provider includes one or more food items provided by the carrier during travel;

responsive to determining that the food order of the selected food provider does include one or more food items provided by the carrier during travel, modifying by the data processing system of the carrier the food order of the selected food provider to remove the one or more food items provided by the carrier during travel from the food order of the selected food provider, wherein the one or more food items removed from the food order of the selected food provider are provided by the carrier;

retrieving by the data processing system of the carrier a real-time travel itinerary of scheduled departure and arrival times and locations for the traveler;

determining by the processor whether the real-time travel itinerary of scheduled departure and arrival travel times and locations for the traveler has changed;

responsive to determining that the real-time travel itinerary of scheduled departure and arrival travel times and locations for the traveler has changed, adjusting by the data processing system of the carrier the food order of the selected food provider in accordance with changes to the real-time travel itinerary of scheduled departure and arrival travel times and locations for the traveler;

responsive to adjusting the food order of the selected food provider in accordance with the changes to the real-time travel itinerary of scheduled departure and arrival travel times and locations for the traveler, sending by the data processing system of the carrier a notification of an adjustment to the food order of the selected food provider to the traveler;

scanning by a scanning device communicatively coupled to the data processing system of the carrier a carrier conveyance travel ticket for the traveler at a point of departure prior to the traveler boarding a carrier conveyance;

determining by the processor whether the food order of the selected food provider is ready for delivery when the carrier conveyance ticket for the traveler is scanned by the scanning device;

responsive to determining that the food order of the selected food provider is ready for delivery, transmitting by the data processing system of the carrier to the scanning device an indication that the food order of the selected food provider is ready for delivery; and indicating on the scanning device that the food order of the selected food provider is ready for delivery, wherein the food order of the selected food provider that does not include the one or more food items provided by the carrier during travel is delivered by personnel to the traveler in response to the indication.

2. The computer implemented method of claim 1, wherein adjusting the food order comprises an adjustment to a content of the food order.

3. The computer implemented method of claim 1, wherein adjusting the food order comprises an adjustment to a time of delivery for the food order.

4. The computer implemented method of claim 1, wherein adjusting the food order comprises an adjustment to a location of delivery for the food order.

5. The computer implemented method of claim 1, wherein the food order is delivered at one of the point of departure, a point of arrival, or a point en route.

6. The computer implemented method of claim 5, wherein the point en route is one of a point of departure or a point of arrival for a connecting carrier conveyance.

7. The computer implemented method of claim 1, wherein the carrier charges the traveler a surcharge for the food order.

8. The computer implemented method of claim 1, wherein the carrier transports travelers by means of the carrier conveyance.

9. The computer implemented method of claim 1, wherein information regarding the food order is stored in a profile of preferences for the traveler in a storage device.

10. A computer program product stored on a tangible computer usable storage medium having computer usable program code embodied thereon that when executed by a computer system for creating a food order for a traveler, said computer program product comprising:

computer usable program code for displaying by a carrier a list of non-carrier food providers to the traveler on a website of the carrier for use in ordering food items;

computer usable program code for receiving by the carrier a selection of a food provider by the traveler from the displayed list of non-carrier food providers on the website, wherein the traveler selects food items for the food order from available food items of the selected food provider, and wherein the selected food provider provides the food items for the traveler;

computer usable program code for receiving by the carrier the food order of the selected food provider from the traveler;

computer usable program code for determining by the carrier whether the food order of the selected food provider includes one or more food items provided by the carrier during travel;

computer usable program code, responsive to determining that the food order of the selected food provider does include one or more food items provided by the carrier during travel, for modifying by the carrier the food order of the selected food provider to remove the one or more food items provided by the carrier during travel from the food order of the selected food provider, wherein the one or more food items removed from the food order of the selected food provider are provided by the carrier;

computer usable program code for retrieving by the carrier a real-time travel itinerary of scheduled departure and arrival times and locations for the traveler;

computer usable program code for determining whether the real-time travel itinerary of scheduled departure and arrival travel times and locations for the traveler has changed;

computer usable program code, responsive to determining that the real-time travel itinerary of scheduled departure and arrival travel times and locations for the traveler has changed, for adjusting by the carrier the food order of the selected food provider in accordance with changes to the real-time travel itinerary of scheduled departure and arrival travel times and locations for the traveler;

computer usable program code, responsive to adjusting the food order of the selected food provider in accordance with the changes to the real-time travel itinerary of scheduled departure and arrival travel times and locations for the traveler, for sending by the carrier a notification of an adjustment to the food order of the selected food provider to the traveler;

computer usable program code for scanning by a scanning device of the carrier a carrier conveyance travel ticket for the traveler at a point of departure prior to the traveler boarding a carrier conveyance;

computer usable program code for determining whether the food order of the selected food provider is ready for delivery when the carrier conveyance ticket for the traveler is scanned by the scanning device;

computer usable program code, responsive to determining that the food order of the selected food provider is ready for delivery, for transmitting to the scanning device an indication that the food order of the selected food provider is ready for delivery; and computer usable program code for indicating on the scanning device that the food order of the selected food provider is ready for delivery, wherein the food order of the selected food provider that does not include the one or more food items provided by the carrier during travel is delivered by personnel to the traveler in response to the indication.

11. The computer program product of claim 10, wherein adjusting the food order comprises an adjustment to a content of the food order.

12. The computer program product of claim 10, wherein adjusting the food order comprises an adjustment to a time of delivery for the food order.

13. The computer program product of claim 10, wherein adjusting the food order comprises an adjustment to a location of delivery for the food order.

14. The computer program product of claim 10, wherein the food order is delivered at one of the point of departure, a point of arrival, or a point en route.

15. The computer program product of claim 14, wherein the point en route is one of a point of departure or a point of arrival for a connecting carrier conveyance.

16. The computer program product of claim 10, wherein the carrier charges the traveler a surcharge for the food order.

17. The computer program product of claim 10, wherein the carrier transports travelers by means of the carrier conveyance.

18. The computer program product of claim 10, wherein information regarding the food order is stored in a profile of preferences for the traveler in a storage device.

19. A data processing system for creating a food order for a traveler, the data processing system comprising:
   a storage device connected to a bus, wherein the storage device contains a computer usable program code; and
   a processor connected to the bus, wherein the processor is configured to execute the computer usable program code to display by a carrier a list of non-carrier food providers to the traveler on a website of the carrier for use in ordering food items; receive by the carrier a selection of a food provider by the traveler from the displayed list of non-carrier food providers on the website, wherein the traveler selects food items for the food order from available food items of the selected food provider, and wherein the selected food provider provides the food items for the traveler; receive by the carrier the food order of the selected food provider from the traveler; determine by the carrier whether the food order of the selected food provider includes one or more food items provided by the carrier during travel; modify by the carrier the food order of the selected food provider to remove the one or more food items provided by the carrier during travel from the food order of the selected food provider in response to determining that the food order of the selected food provider does include one or more food items provided by the carrier during travel, wherein the one or more food items removed from the food order of the selected food provider are provided by the carrier; retrieve by the carrier a real-time travel itinerary of scheduled departure and arrival times and locations for the traveler; determine whether the real-time travel itinerary of scheduled departure and arrival travel times and locations for the traveler has changed; adjust by the carrier the food order of the selected food provider in accordance with changes to the real-time travel itinerary of scheduled departure and arrival travel times and locations for the traveler in response to determining that the real-time travel itinerary of scheduled departure and arrival travel times and locations for the traveler has changed; send by the carrier a notification of an adjustment to the food order of the selected food provider to the traveler in response to adjusting the food order of the selected food provider in accordance with the changes to the real-time travel itinerary of scheduled departure and arrival travel times and locations for the traveler; scan by a scanning device of the carrier a carrier conveyance travel ticket for the traveler at a point of departure prior to the traveler boarding a carrier conveyance; determine whether the food order of the selected food provider is ready for delivery when the carrier conveyance ticket for the traveler is scanned by the scanning device; transmit to the scanning device an indication that the food order of the selected food provider is ready for delivery in response to determining that the food order of the selected food provider is ready for delivery; and indicate on the scanning device that the food order of the selected food provider is ready for delivery, wherein the food order of the selected food provider that does not include the one or more food items provided by the carrier during travel is delivered by personnel to the traveler in response to the indication.

20. The apparatus of claim 19, wherein information regarding the food order is stored in a profile of preferences for the traveler in the storage device.

* * * * *